Oct. 29, 1963 MANABU KASHIHARA 3,108,497
INFINITELY VARIABLE SPEED CHANGE GEAR
Filed March 8, 1961 3 Sheets-Sheet 3

INVENTOR.

BY

United States Patent Office 3,108,497
Patented Oct. 29, 1963

3,108,497
INFINITELY VARIABLE SPEED CHANGE GEAR
Manabu Kashihara, 12 Karahashi-Hanazono-cho,
Minami-ku, Kyoto, Japan
Filed Mar. 8, 1961, Ser. No. 94,249
Claims priority, application Japan Mar. 29, 1960
3 Claims. (Cl. 74—796)

This invention relates to improvements in infinitely variable speed change gears using a plurality of double cone wheels.

In this specification, I define a term "double cone wheel" as a cone wheel having two cone surfaces arranged co-axially and being positioned with the apexes of the cone surfaces in opposite sides, a term "bottom cone surface" as the one cone surface of the double cone wheel arranged in the supporting side, and a term "top cone surface" as the other cone surface of the double cone wheel.

Heretofore, various types of infinitely variable speed change gears utilizing double cone wheels are known. But so far as I know they are accompanied with difficulties in relatively big operating force, in complex construction, in hard adjustment, or in undesirable pressure contact conditions between the double cone wheels and their engaging members.

The main object of my invention is to provide infinitely variable speed change gears that are operated smoothly by quite a small force and useful in various fields of automatic control.

The other object of my invention is to provide infinitely variable speed change gears having a high durability and having a relatively simple construction.

The present invention provides an infinitely variable speed change gear, comprising a driving shaft and a driven shaft arranged coaxially, a plurality of double cone wheels, the top cone surface of each double cone wheel being so arranged as to touch internally at one generating line to an imaginary common cylindrical surface which has the same axis with the axis of the driving shaft, a rotatable member with a ring-shape part engaging at one point to the top cone surface of each double cone wheel, means to transmit the rotation of the rotatable member to the driven shaft permitting the axial displacement of the member, operating means to shift the rotatable member along the top cone surfaces of the double cone wheels and a common member supporting the shafts of the double cone wheels, the top cone surfaces and the bottom cone surfaces of the double cone wheels participating in the transmission of the rotation from the driving shaft to the driven shaft and the effective radii of rotation of the double cone wheels being varied by the operating means changing the speed of rotation of the driven shaft.

The rotatable member with a ring-shape part in the infinitely variable speed change gear according to the present invention can be shifted by quite a small force and the speed change operaton may be executed smoothly.

My invention will be apparent from the following description taken with the accompanying drawings in which.

Figure 1:
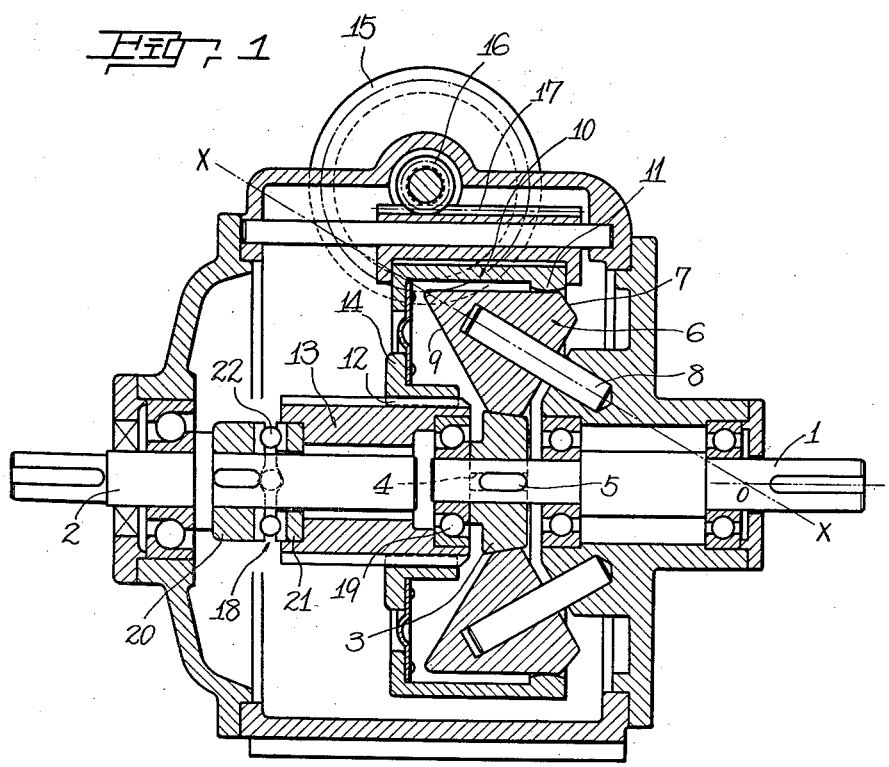
FIG. 1 is a longitudinal section view of an infinitely variable speed change gear according to the present invention.

In FIG. 1 the infinitely variable speed change gear comprises a driving shaft 1 and a driven shaft 2 arranged coaxially. A cone wheel 3 is mounted at the end of the driving shaft 1. The cone wheel 3 is engaged to the driving shaft 1 by means of a feather key 5 and a key way 4 and may be permitted to slide axially relative to the driving shaft 1.

A plurality of double cone wheels 6 are engaged to the cone wheel 3 at their bottom cone surface 7. The shafts 8 of the double cone wheels 6 are supported rotatively by the casing of the infinitely variable speed change gear, and arranged to distribute their axial lines X—X on the generating lines of an imaginary cone surface converging to a point 0 on the driving shaft 1. The imaginary cone surface diverges from the driving shaft side to the driven shaft side. The top cone surface 9 of each double cone wheel 6 is so arranged as to touch internally at one generating line to an imaginary common cylindrical surface which has the same axis with the driving shaft 1. The angle of apex of the top cone surface 9 is determined to permit the above said arrangement.

A rotatable member 10 with ring-shape portion 11 engages to the top cone surface 9 of each double cone wheel 6 commonly. And as the top cone surfaces 9 of the double cone wheels 6 are arranged as to touch internally to a common imaginary cylindrical surface, the rotatable member 10 can be shifted axially maintaining the engagements to the double cone wheels 6. The rotatable member 10 has a splined portion 14 and meshes to a member 13 mounted rotatively on the driven shaft 2. The rotation of the member 10 is transmitted to the member 13 by means of spline 12. The rotatable member 10 can be shifted by means of operating means comprising a handle 15, a pinion 16 and a rack 17 meshed with the pinion 16. The engaging points between the rotatable member 10 and the top cone surfaces 9 of the double cone wheels 6 are changed by turning the handle 15 and the effective radius of rotation of the top cone surface 9 varied continuously. As the forces acting on the rotatable member 10 due to the pressure contacts to the double cone wheels 6 are directed radially and have no axial components, the rotatable member 10 can be shifted smoothly by quite a small force.

The member 13 also acts as a thrust transmitting member. At the one end of the member 13, a "ball and cam engaging device" 18 is arranged, and at the other end of the member 13 a thrust bearing 19 is arranged. The "ball and cam engaging device" 18 comprises a piece 20 fixed to the driven shaft 2, a piece 21 fixed to the rotatable member 13 and several balls 22 arranged between the cam surfaces of the pieces 20, 21, and acts as the means to produce engaging pressures between the double cone wheels and their engaging member 3, 10.

In the infinitely variable speed change gear explained when the driving shaft 1 rotates, the cone wheel 3, double cone wheels 6, rotatable member 10 and the member 13 are rotated successively. Then the balls 22 in the "ball and cam engaging device" 18 fix the member 13 to the driven shaft 2 and also advance the member 13 to the right hand producing the sufficient engaging pressures between the double cone wheels 6 and their engaging members 3, 10.

Figure 2:
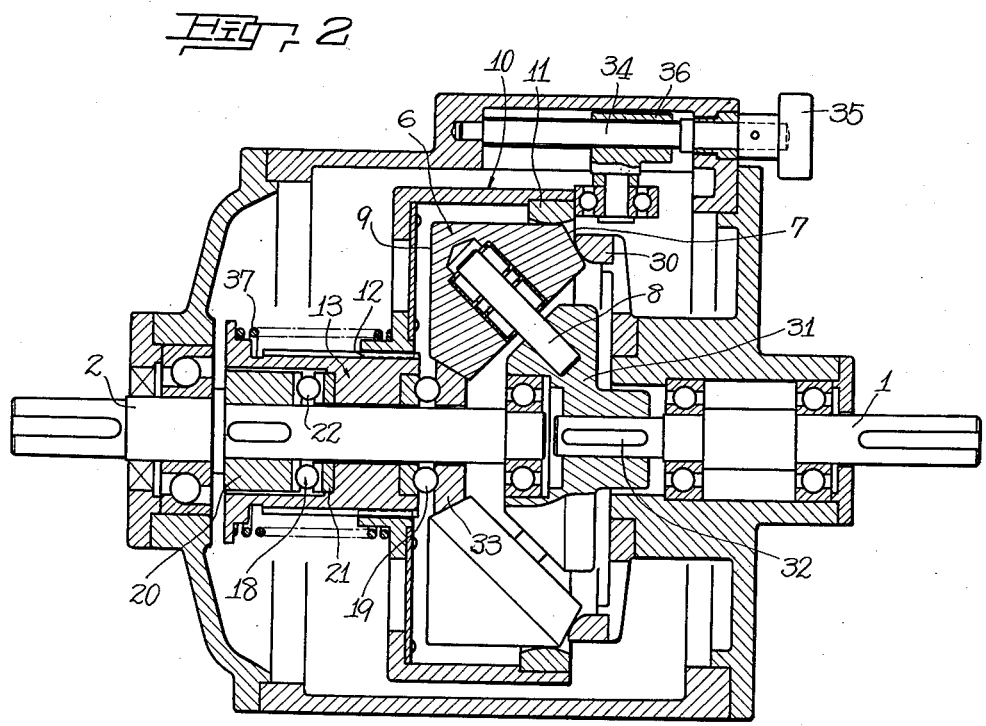
FIG. 2 is a longitudinal section view of another infinitely variable speed change gear according to the present invention.
Figure 3:
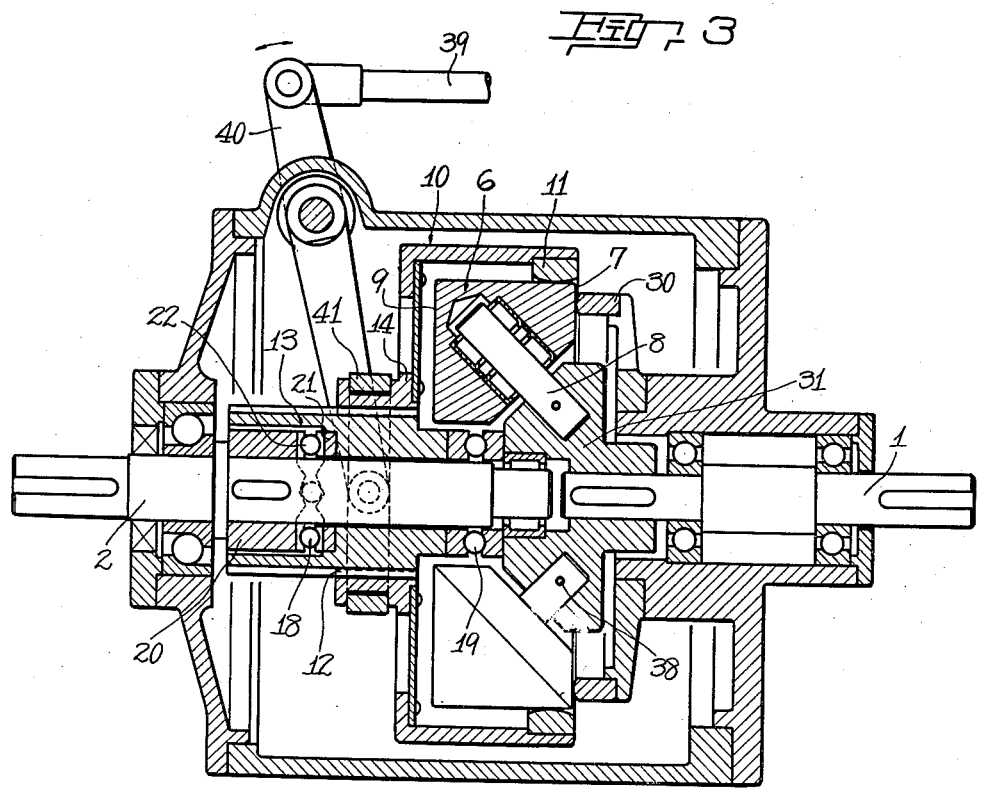
FIG. 3 is a longitudinal section view of an infinitely variable speed change gear slightly modified in the form shown in FIG. 2.

The infinitely variable speed change gears shown in FIG. 2 and FIG. 3 are that of the forms which use a track ring respectively. In these figures, parts equivalent to the parts shown in FIG. 1 are marked with the same numerals. The infinitely variable speed change gear shown in FIG. 2 is provided with a stationary track ring or a rail ring 30 fixed to the casing of the speed change gear, a shaft supporting member 31 fixed to the driving shaft 1 by means of a key 32 and a cone wheel 33 engaged to the bottom cone surface 7 of the double cone wheels 6. The cone wheel 33 is mounted rotatively on the driven shaft and the thrusting force due to the "ball and cam engaging device" 18 is transmitted through the member 13, thrust bearing 19 and the cone wheel 33 to the double cone wheels 6. The infinitely variable speed change gear is also provided with operating means comprising a screw bar 34 with a grip handle 35, a nut member 36 and a spring 37.

The infinitely variable speed change gear shown in FIG. 3 has a similar construction compared to the one shown in FIG. 2, but takes a different system in the transmission of the thrusting force from the "ball and cam engaging device" 18 to the double cone wheels 6. In this form there is not provided the cone wheel 33 in FIG. 2 and the thrust bearing 19 is abutted to the end of the shaft supporting member 31 to transmit the thrusting force through the member 31, pins 38 and the shafts 8. The operating means also takes another form comprising an operating rod 39, a lever 40 with a forked end and ring 41 engaged to the groove on the portion 14 of the rotatable member 10.

The speed changing characteristics of the infinitely variable speed change gear shown in FIG. 1 is given by the following formula.

Amont of the rotation of the driven shaft $= -cCN$ where:

$c$ = ratio of the effective radius of rotation between the bottom cone surface 7 of the double cone wheel 6 and the cone wheel 3.
$C$ = ratio of the effective radius of rotation between the rotatable member 10 and the top cone surface of the double cone wheel 6.
$N$ = amount of rotation of the driving shaft 1.

And the speed changing characteristics of the infinitely variable speed change gear shown in FIG. 2 and FIG. 3 is given by the following formula.

Amount of rotation of the driven shaft $$= \left(1 - \frac{C'}{c'}\right)N$$

where:

$c'$ = ratio of the effective radius of rotation between the track ring 30 and the bottom cone surface 7 of the double cone wheel 6.
$C'$ = ratio of the effective radius of rotation between the rotatable member 10 and the top cone surface 9 of the double cone wheel 6.

What I claim is:

1. An infinitely variable speed change gear, comprising a driving shaft and a driven shaft arranged coaxially, a cone wheel keyed to the driving shaft, a plurality of double cone wheels having the top cone surface arranged to touch internally at one generating line to an imaginary common cylindrical surface which has the same axis with the axis of the driving shaft and the bottom cone surface engaged to the cone wheel on the driving shaft, the shaft of each double cone wheel being supported by the casing of the speed change gear, a rotatable member with a ring-shape part engaging at one point to the top cone surface of each double cone wheel, operating means to shift the rotatable member along the top cone surfaces of the double cone wheels, means for transmitting the rotation of the rotatable member to the driven shaft said means comprising a splined member guiding said rotatable member axially and a "ball-and-cam engaging device" mounted on the driven shaft, and a thrust bearing arranged between said splined member and the cone wheel keyed to the driving shaft, said "ball-and-cam engaging device" being utilized to generate engaging pressures between the cone wheel, the double cone wheels and their engaging members.

2. An infinitely variable speed change gear, comprising a driving shaft and a driven shaft arranged coaxially, a plurality of double cone wheels, the top cone surface of each double cone wheel being so arranged as to touch internally at one generating line to an imaginary common cylindrical surface which has the same axis with the axis of the driving shaft, a stationary track ring engaged to the bottom cone surface of each double cone wheel, a rotatable member with a ring-shape part engaging at one point to the top cone surface of each double cone wheel, operating means to shift the rotatable member along the top cone surfaces of the double cone wheels, means for transmitting the rotation of the rotatable member to the driven shaft said means comprising a splined member guiding said rotatable member axially and a "ball-and-cam engaging device" mounted on the driven shaft, a member keyed to the driving shaft and supporting the shafts which support the double cone wheels rotatively, a cone wheel rotatively mounted on the driven shaft and engaged to the bottom cone surfaces of the double cone wheels, and a thrust bearing arranged between the cone wheel and the splined member said "ball-and-cam engaging device" being utilized to generate thrusting force and the thrusting force being transmitted through the thrust bearing to the cone wheel so as to produce engaging pressures between the cone wheel, the double cone wheels, the track ring and the rotatable member.

3. An infinitely variable speed change gear, comprising a driving shaft and a driven shaft arranged coaxially, a plurality of double cone wheels, the top cone surface of each double cone wheel being so arranged as to touch internally at one generating line to an imaginary common cylindrical surface which has the same axis with the axis of the driving shaft, a stationary track ring engaged to the bottom cone surface of each double cone wheel, a rotatable member with a ring-shape part engaging at one point to the top cone surface of each double cone wheel, operating means to shift the rotatable member along the top cone surfaces of the double cone wheels, means for transmitting the rotation of the rotatable member to the driven shaft said means comprising a splined member guiding said rotatable member axially and a "ball-and-cam engaging device" mounted on the driven shaft, a member keyed to the driving shaft and rigidly supporting the shafts which support the double cone wheels rotatively, and a thrust bearing arranged between the member last mentioned and said splined member, said "ball-and-cam engaging device" being utilized to generate thrusting force and the thrusting force being transmitted through said thrust bearing, the member keyed to the driving shaft and the shafts of the double cone wheels to said double cone wheels to generate engaging pressures between the double cone wheels the track ring and the rotatable member.

References Cited in the file of this patent
UNITED STATES PATENTS

| 2,580,392 | Bade | Jan. 1, 1952 |
| 2,836,994 | Weber | June 3, 1958 |

FOREIGN PATENTS

| 683,063 | Germany | Oct. 30, 1939 |